United States Patent
Syverson

(10) Patent No.: US 6,244,427 B1
(45) Date of Patent: *Jun. 12, 2001

(54) MODULAR GEARLESS MOTORIZED CONVEYOR ROLLER

(75) Inventor: Charles D. Syverson, North Mankato, MN (US)

(73) Assignee: Motion Systems, L.C., White Lake, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,481

(22) Filed: Aug. 12, 1999

Related U.S. Application Data

(63) Continuation-in-part of application No. 09/294,232, filed on Apr. 19, 1999, which is a continuation-in-part of application No. 08/931,593, filed on Sep. 16, 1997, now Pat. No. 5,918,728.

(51) Int. Cl.[7] ............................................. B65G 13/06
(52) U.S. Cl. ........................................ 198/788; 198/784
(58) Field of Search .................................. 198/784, 788, 198/781.05, 781.06; 310/156, 261, 267

(56) References Cited

U.S. PATENT DOCUMENTS

| | | |
|---|---|---|
| 1,448,712 | 3/1923 | Pool . |
| 1,743,223 | 1/1930 | Lowy . |
| 1,825,119 | 9/1931 | Mug . |
| 1,889,173 | 11/1932 | Drexler . |
| 2,013,858 | 9/1935 | Lawlor . |
| 2,175,860 | 10/1939 | Walmann . |
| 2,915,167 | 12/1959 | Berger . |
| 4,047,609 | 9/1977 | Nazuka . |
| 4,082,180 | 4/1978 | Chung . |
| 4,998,052 | 3/1991 | Erdman et al. . |
| 5,022,513 | 6/1991 | Huber . |

(List continued on next page.)

FOREIGN PATENT DOCUMENTS

| | | |
|---|---|---|
| 518773 | 2/1931 | (DE) . |
| 2616418 A1 | 6/1987 | (FR) . |
| 54-159982 | 12/1979 | (JP) . |
| 3-98905 | 4/1991 | (JP) . |
| 1486199 | 6/1989 | (SU) . |

OTHER PUBLICATIONS

"Kane Magnetics Materials" Advertizing document, p. 3, 1998.*
"ITOH Power Moller® J–Series," Somfy Systems, Inc., Cranbury, NJ, 4 pages.
"ITOH Power Moller® S–Series," Somfy Systmes, Inc., Cranbury, NJ, 4 pages.
"Power Moller®," Somfy Systems, Inc., Cranbury, NJ, Aug. 16, 1993, 7 pages.
"Motorola Brushless DC Motor Controller", Motorola, Inc., 1998.

*Primary Examiner*—Christopher P. Ellis
*Assistant Examiner*—Mark A. Deuble
(74) *Attorney, Agent, or Firm*—Lathrop & Clark, LLP

(57) ABSTRACT

A drive roller has a brushless D.C. motor with a stator or armature mounted on a fixed shaft and directly driving a 16 pole permanent magnet rotor mounted inside a roller tube. A motor controller drive supplies three-phase power to a Y-connected three phase winding having three groups of two coils, forming twelve electromagnets which drive the rotor. The modular motor is readily built in one inch increments to supply one lb-in of torque for each increment. The controller operates at a relatively low frequency of 15–75 Hz. Hall effect sensors provide feedback on motor speed and position. The armature laminations are relatively thick because of the relatively low power necessary to drive the motor and the resultant relatively low eddy currents present in the motor core. A 4.0 lb-in torque motor with a rotor and stator length of four inches will draw approximately 0.8 amps consuming about 15 Watts.

20 Claims, 6 Drawing Sheets

U.S. PATENT DOCUMENTS

| | | |
|---|---|---|
| 5,025,915 | 6/1991 | Huber . |
| 5,030,864 | 7/1991 | Van Hout et al. . |
| 5,033,611 | 7/1991 | Huber . |
| 5,088,596 | 2/1992 | Agnoff . |
| 5,127,513 | 7/1992 | Huber . |
| 5,131,527 | 7/1992 | Huber . |
| 5,180,344 | 1/1993 | Hall . |
| 5,336,956 | 8/1994 | Haner . |
| 5,413,209 | 5/1995 | Werner . |
| 5,462,156 | 10/1995 | Kobayashi et al. . |
| 5,548,173 | 8/1996 | Stephenson . |
| 5,918,728 * | 7/1999 | Syverson ............................... 198/788 |
| 5,923,111 * | 7/1999 | Eno et al. ............................ 310/156 |
| 5,927,477 * | 10/1999 | Meitunnen ........................... 198/788 |
| 6,125,993 * | 10/2000 | Hansson ............................... 198/788 |

* cited by examiner

MODULAR GEARLESS MOTORIZED CONVEYOR ROLLER

CROSS REFERENCES TO RELATED APPLICATIONS

This application is a continuation-in-part of application Ser. No. 09/294232 filed Apr. 19, 1999, which is a continuation-in-part of application Ser. No. 08/931593 filed Sep. 16, 1997, now U.S. Pat. No. 5,918,728 both of which are incorporated by reference herein.

STATEMENT AS TO RIGHTS TO INVENTIONS MADE UNDER FEDERALLY SPONSORED RESEARCH AND DEVELOPMENT

BACKGROUND OF THE INVENTION

The present invention relates to roller conveyors and motorized rollers used to move packages along roller conveyors.

Roller conveyors are used to move packages, trays, or containers where accumulation of individual containers is required. Roller conveyors may be advantageously used when items are accumulated from a number of locations and dispatched to multiple destinations, for example in moving sorted mail contained in trays from sorting locations to a loading dock where mail destined for a particular vehicle or container is accumulated. Roller conveyors consist of a roller tube which is mounted for rotation about the cylindrical axis of the roller. The rollers are spaced on the conveyors so that the minimum sized package is supported by at least three rollers at all times. Drive rollers are positioned between idler rollers and used to move and stop packages on the conveyor. The spacing and number of drive rollers relative to idler rollers depends on the size of the packages anticipated and the torque or drive force which is required. Groups of drive rollers may be used if greater drive force is required.

Although drive rollers may be driven by belts from external motors, the typical modern approach is to use rollers with internal electric motors which are mounted to a fixed shaft and drive the roller through a gear system. The use of internal-motor-driven rolls simplifies the assembly of the roll conveyor and eliminates a large number of pulleys and external motors which occupy space and require guards to protect workers.

Roller conveyors can be used to precisely control the motion of many packages with each motor under the control of a central computer or programmable controller. By controlling the individual drive motors, a package can be moved forward or can be brought to a stop by using the drive rollers as a brake. The rollers can operate individually or as an integrated system to accumulate packages with zero pressure, and release packages in a slug release or singulation mode. A roller conveyor can be used to combine streams of packages onto a single conveyor going to a single or multiple destinations. Packages on a first conveyor line which intersects a second conveyor line can be held and injected one by one as space becomes available on the second conveyor. Thus the conveyors will typically be used with multiple sensors which sense the passage of discrete packages, and a controller which is designed and programmed for a particular application.

Standard rollers of both the drive and idler types are 1.9 inches in diameter. The drive rollers are typically supplied as a sealed unit and utilize small high speed brush motors. The roller sealed units are typically disposed of when the brushes wear out. The typical life of a drive roller and motor unit is less than 2,000 hours. A typical drive roller costs $90.00 and has a service life of less than one year. Although units using brushless D.C. motors are known, the life of the units is still limited by the life of the gears which drive the roller tube.

Cost is a very important consideration in the design of drive rollers for roller conveyors. A typical installation may contain hundreds to thousands of feet of conveyor and, with one drive roller spaced every two to three feet, the number of drive rollers which must be purchased yearly to maintain such a system can be a considerable expense.

Although most roller conveyors use rollers having a diameter of 1.9 inches, the length of the rollers varies, and drive rollers are provided in a number of standard lengths.

What is needed is a drive roller with a longer life and a lower cost.

SUMMARY OF THE INVENTION

The drive roller of this invention utilizes a brushless D.C. motor which has a stator or armature mounted on a fixed shaft which directly drives a permanent magnet rotor mounted inside a roller tube. A motor controller drive supplies three-phase 24-volt power to a Y-connected three phase winding which is composed of three groups of four coils. Thus twelve electromagnets are formed. The electromagnets are used to drive the permanent magnet rotor which has sixteen poles. The brushless D.C. motor is of a modular design and can be easily built in two inch length increments to supply 2 lb-in of torque for each two-inch increment. The motor controller operates at a relatively low variable frequency of 15–75 Hz. Because of the low drive frequency, hysteresis losses in the armature laminations are extremely low and ordinary mild steel can be used to form them. The armature laminations making up the brushless D.C. motor core are also relatively thick because of the relatively low frequency power necessary to drive the motor and the resultant relatively low eddy currents present in the motor core. For a motor with a 4.0 lb-in design torque and a rotor and stator length of four inches, the current draw will be approximately 1.5 amps at rated torque consuming about 35 watts of power. The motor will drive the roller at approximately 265 rpm which corresponds to a conveyor speed of approximately two feet per second or 120 feet per minute.

Because the only moving parts of the drive roller are the bearings, which have a life of approximately 100,000 hours, the overall life of the drive unit is expected to be considerably more then ten times that of conventional units. In addition, the cost of the units is expected to be less than existing units because of the elimination of gears and brushes. The motor itself utilizes low-cost ferrite magnets in the rotor and low-cost armature cores utilizing mild steel and relatively few laminations. Further, the construction of the motor is simplified because the windings are inserted into the core from the outside of the core and thus are cost-effectively manufactured.

It is an object of the present invention to provide a drive roller for a roller conveyor which has a longer operational life.

It is a further object of the present invention to provide a drive roller for a roller conveyor which is designed for cost-effective production.

It is another object of the present invention to provide a drive roller in which the drive speed can be precisely controlled.

It is also an object of the present invention to provide a drive roller for a roller conveyor which can be used to position articles on a roller conveyor.

Further objects, features and advantages of the invention will be apparent from the following detailed description when taken in conjunction with the accompanying drawings.

DESCRIPTION OF THE PREFERRED EMBODIMENTS

Figure 1:
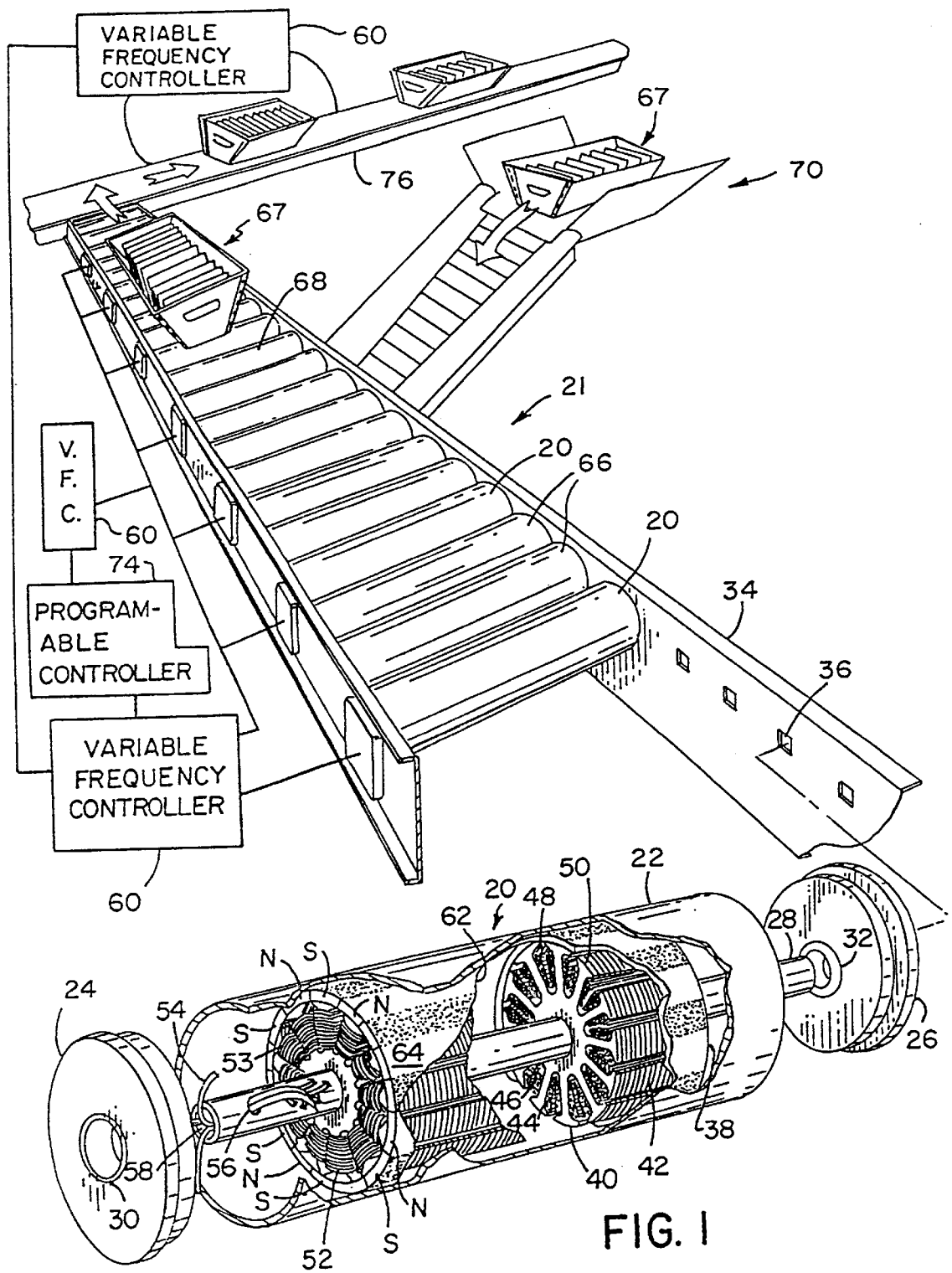
FIG. 1 is an exploded perspective view of a drive roller of this invention, partially broken away in section, and shown in relation to a conveyor with a schematic illustration of the control system therefor.

Referring more particularly to FIGS. 1–8, wherein like numbers refer to similar parts, as shown in FIG. 1, a number of drive rollers 20 are mounted in a frame 34 along with idler rollers 66 to form a roller conveyor 21. Each drive roller 20 has a stator 40 with Y-connected windings which is fixed to an axially extending shaft 28 which supports a roller tube 22 and permanent magnet rotor 62 on bearings 30, 32. Each roller tube 22 is sealed with a first end cap 24 and second end cap 26. The roller tube 22 is mounted for rotation on the shaft 28 by first bearings 30 and second bearings 32 which are mounted in the first end cap 24, and the second end cap 26 respectively. The drive roller shaft 28 extends through and beyond the end caps 24, 26 on both ends of the tube 22 and extends into holes 36 in the frame 34. The ends of the shaft 28 are preferably nonround to engage fixedly within the frame holes 36 to prevent rotation of the shaft.

A brushless D.C. motor 38 is contained within the roller tube 22. The motor has a stator 40 mounted to the shaft 28. The stator 40 consists of forty laminations 42 which form a core 44 on which coils 52 are wound. The laminations 42 are approximately 1/10th of an inch thick and are constructed of mild steel to minimize cost. The core 44 constructed from the laminations 42 has twelve slots 48 separated by T-shaped core posts 50. Three groups of four coils 52 are wound on the core 44. Each coil consists of 65 turns of No. 26 copper wire. The four coils 52 of each group are positioned sequentially with coils of the other two groups so that no two coils from the same group are adjacent, but alternate in regular order as is conventional for the windings of an electric motor. Each group of four coils is wound from a single wire 53 which has two ends 54. The three wires are connected together at a first end 54 of the single wires 53 to form a Y-connected winding, and the other ends 54 of the wires 53 are the leads through which one of three phases of electric power is supplied.

The construction of the stator 40 facilitates low-cost fabrication by allowing the wires 53 forming the winding 52 to be inserted through slots 46 between the T-shaped core posts 50. Because the slots are on an outwardly facing portion of the stator 40, they are easily accessed for automatic winding of the wires 53 within the slots 46. This allows the use of lower cost machinery which can operate at higher speeds.

The ends 54 of the wires 53 are led through a hole 56 in the side of the shaft 28. The hole 36 leads to an axial bore 58 which allows the wires to pass through the center of the shaft 28 and through the bearing supporting the shaft. The ends 54 of the wires 53 are connected to a motor controller 60. The motor controller 60 supplies three phase twenty-four volt current to the windings on the core 44 of the motor 38.

A permanent ferrite magnetic shell 64 serves as the rotor 62 of the drive roller motor 38. The shell 64 has sixteen poles: eight north N, and eight south S. The 3/4 ratio between stator electromagnetic poles and the rotor permanent magnetic poles helps to minimize losses in the motor.

The roller tube 22 will typically have a diameter of 1.9 inches, which is the industry standard for roller conveyors, and typically will have a length of at least ten inches. The ferrite magnetic shell 64 is bonded to the interior of the roller tube 22 by an adhesive, for example adhesive 2214 available from the 3M Corporation.

Current is supplied to the windings as is conventionally done in electric motors so that the induced electromagnets formed by the windings on the core react against the magnetic field of the permanent magnets of the shell 64 causing the magnetic shell and the affixed roller tube 22 and end caps 24, 26 to rotate about the shaft 28 on the bearings 30, 32. The design of the motor will produce approximately four inch-pounds of torque. The motor is designed for a velocity of approximately 265 rpm at full speed. This corresponds to roller surface speed of about 2.2 ft/s or about 1.5 miles per hour. The velocity of the rollers can be controlled or decreased by varying the frequency of the drive current between fifteen and seventy-five Hertz, more typically between thirty and fifty Hertz.

Drive rollers 20 are interspersed on the frame 34 intermediate between one or more like diameter idler rollers 66. The idler rollers 66 are similar in overall construction to the drive rollers 20, except that they do not contain a motor and are not driven. Roller conveyors 21 are designed so that the particular packages, boxes or trays 67 which are moved along the conveyor surface 68 are supported at all times by at least three rollers—either drive rollers 20 or idler rollers 66. The spacing of the drive rollers 20 is typically such that only one is engaged with a tray 67 at a time. For example, if the trays 67 are about thirty inches long, the drive rollers 20 could be spaced about three feet apart so that only one drive roller 20 is engaged with a tray 67 at one time.

The design of the conveyor system 70 allows the position of individual trays 67 to be controlled. The presence and placement of a tray 67 can be detected with conventional sensors (not shown). A programmable controller 74 utilizing information from conventional sensors causes a particular package to be accelerated and moved or stopped at a particular location by using the controlled drive rollers 20 to drive and brake individual trays 67. If a tray 67 is by chance not positioned directly over a drive roller 20 an adjacent tray can be used to push it.

Roller conveyors are particularly useful when it is desirable to queue up packages and then introduce individual packages from one conveyor 21 onto another conveyor 76 as space becomes available on the target conveyor.

Roller conveyor systems can be extremely large and complicated, as, for example, are those systems used by the United States Postal Service at major sorting hubs. At these postal hubs mail is sorted by destination and loaded onto trays. A roller conveyor system will utilize a programmable controller to move sorted mail to distant points where mail going to a common destination can be loaded on a single truck or into a single container for transport to that destination.

The construction of the drive roller 20 of the present invention discussed above may be varied to obtain drive rollers of varying torque. By fabricating the permanent magnet shell in two inch lengths, the motor's drive power can be increased or decreased by using one, two, or three magnetic shell sections. If a design having a torque of two inch-pounds is desired, thirty-three core laminations are used and 130 turns of No. 29 copper wire are used in each coil. If on the other hand, a torque of six inch-pounds is desired, three magnetic shell sections are aligned axially along the shaft and the core of the stator is formed with ninety-nine laminations and the coils are wound with 42 turns of No. 24 copper wire.

An alternative drive roller 78 is shown in FIGS. 2–7. The alternative drive roller 78 differs from the drive rollers 20 principally in providing a mechanism for collapsing one side on the shaft supporting the drive roller, having six motor windings instead of twelve, employing a Hall effect sensor, and having a modular rotor magnet fabricated out of flexible bonded NdFeB.

Figure 3:
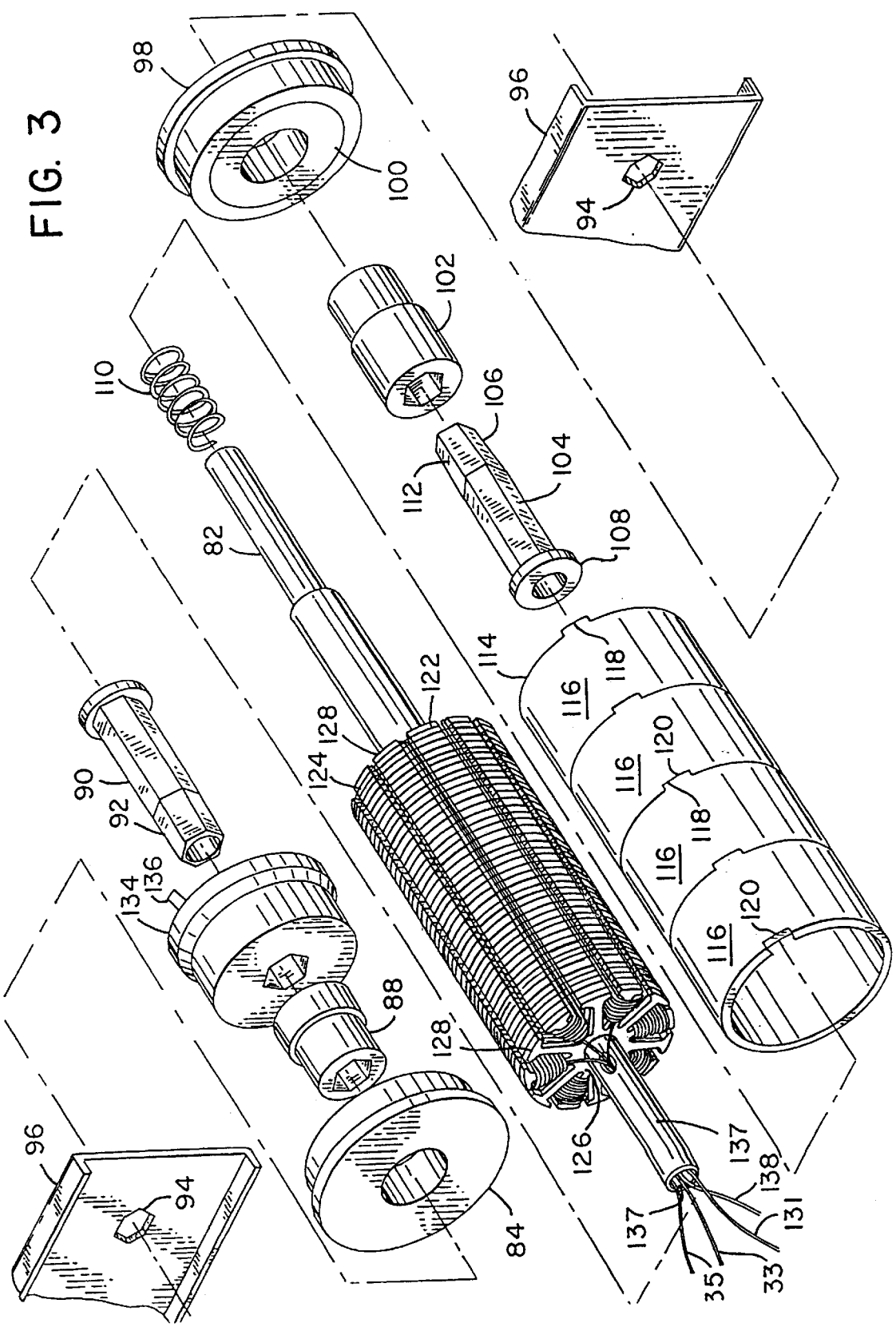
FIG. 3 is an exploded isometric view of the drive roller of FIG. 2.

The drive roller 78 has a roller tube 80 which is rotatably mounted about a shaft 82. The tube 80 has a nominal diameter of 1.875 inches which conforms to the industry standard of about 1.9 inches for most roller conveyor rollers. The tube 80 is mounted to the shaft by a first end cap 84 which supports a first bearing 86. The first bearing engages a bearing insert 88 fabricated of injection molded plastic such as Delrin. The bearing insert 88 in turn slips over a hexagonal shaft extension 90 which mounts on the shaft 82. The shaft extension 90 is constructed from noncorrosive metal powder and has a first end 92 which forms a tapered hexagon for mating with a hexagonal hole 94 in a conveyor frame 96 as shown in FIG. 3.

Figure 4:
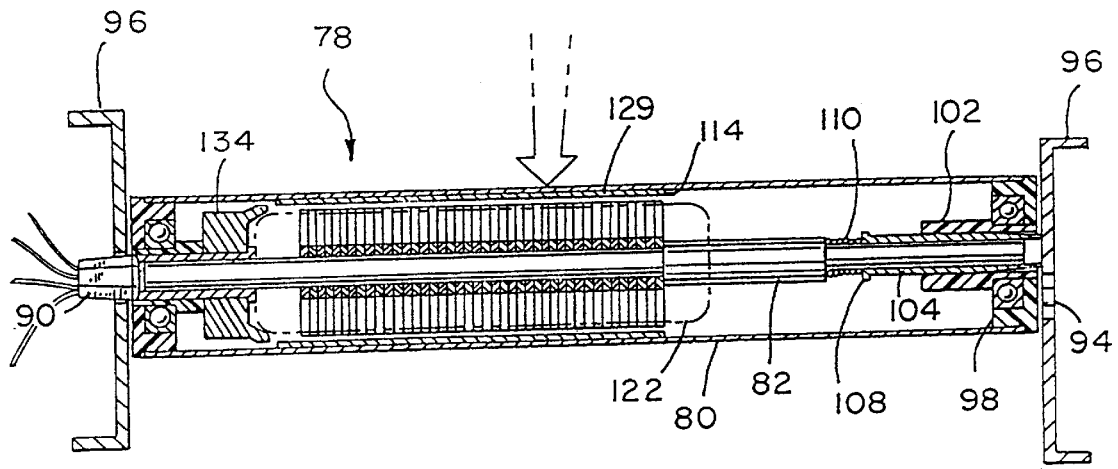
FIG. 4 is a cross-sectional view of the drive roller of FIG. 2 being inserted into a conveyor frame, with the spring loaded hexagonal roller mount shown depressed.
Figure 5:
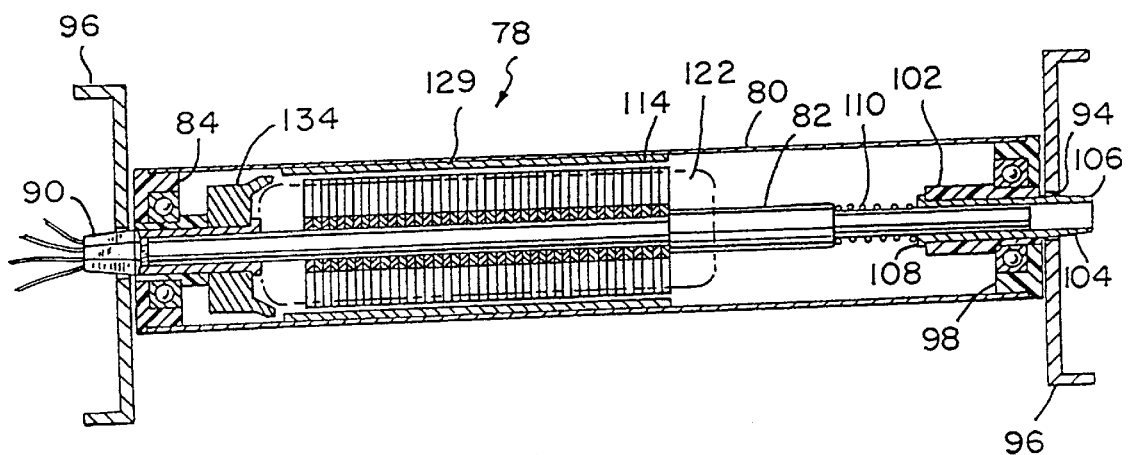
FIG. 5 is a cross-sectional view of the drive roller of FIG. 4, with the spring loaded hexagonal motor mount shown extended into the conveyor frame.

A second end cap 98 mounts the opposite end of the roller tube 80 by way of a second bearing 100 to a bearing insert 102 which mounts over a shaft extension 104 having a tapered hexagonal end 106. The shaft extension 104 is slidingly mounted to the shaft 82. The shaft extension 104 has a flange 108 which engages a spring 110 which biases the shaft extension 104 outwardly of the shaft 82. As shown in FIG. 4, the shaft extension 104 can be moved against the spring 110 bringing the hexagonal end 106 flush with the outwardly facing surface of the second end cap 98. The roller 78 can thus be positioned between parallel portions of the conveyor frame 96 as shown in FIG. 3. When the tapered hexagonal end 106 is aligned with a hexagonal hole 94, the spring 110 extends the shaft extension 104, locking the roller 78 to the conveyor frame 96 as shown in FIG. 5. The shaft extensions 90, 104 have hexagonal tapered surfaces 112 of about one degree. The taper assures a snug engagement with the conveyor frame 96 despite slight variations in tolerances in the holes 94 due to wear or manufacturing tolerances.

A permanent magnetic shell 114 is bonded within the rotor tube 80 to form the rotor 129 of the motor 132. The magnetic shell is constructed as an extruded or injection molded part of flexible bonded NdFeB Grade: FXND-5 available from Kane Magnetics at http://www.kanemagnetics.com/ This type of magnet combines superior magnetic properties with flexibility and reasonable cost. The magnetic shell 114 has sixteen magnetic poles similar to the magnetic shell 64 shown in FIG. 1. The magnetic shell 114 has a radial thickness of approximately 1/10th inch and is fabricated in cylindrical sections 116 approximately one inch long. The cylindrical sections 116 are positioned in angular relationship to one another by alignment tabs 118 and alignment notches 120 which cause the magnetic poles to be aligned. The number of cylindrical sections 116 may be between one and six and produce one to six lb-in nominal torque.

Figure 2:
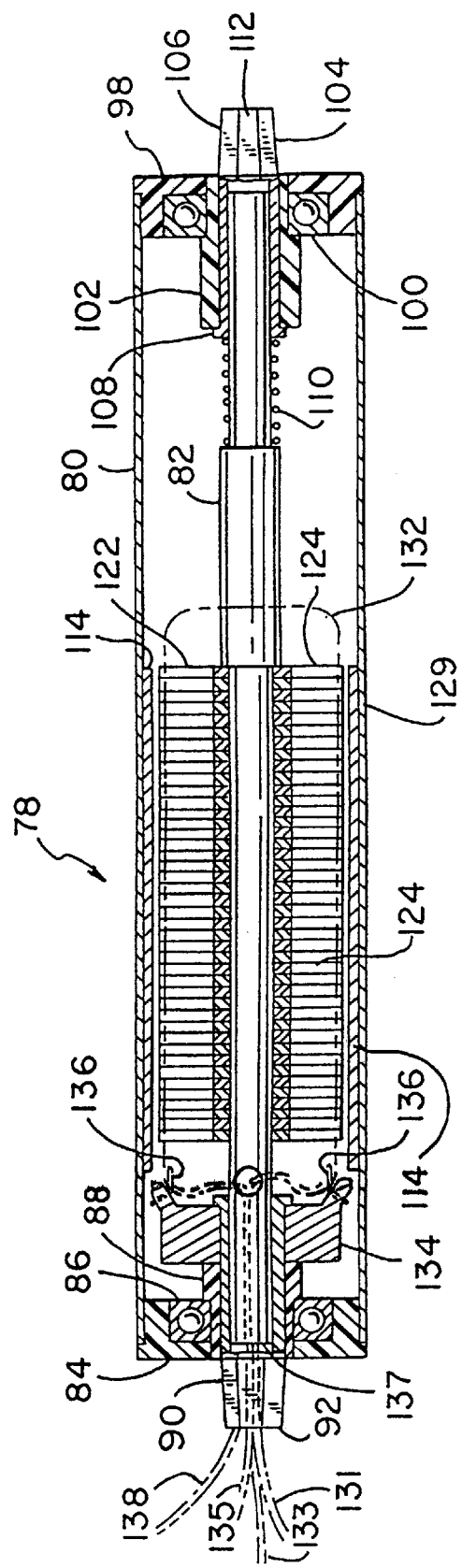
FIG. 2 is a cross-sectional view of an alternative embodiment of the drive roller of FIG. 1.
Figure 6:
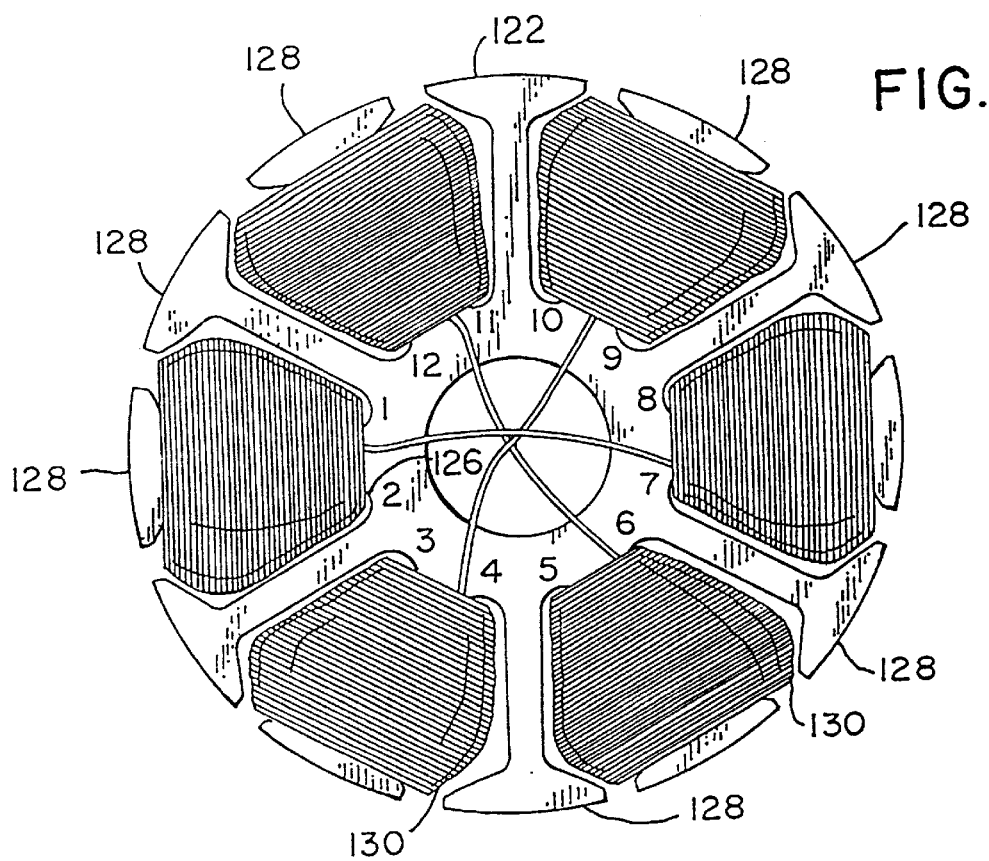
FIG. 6 is an end view of the stator of the motor of FIG. 2 showing six coil windings.
Figure 7:
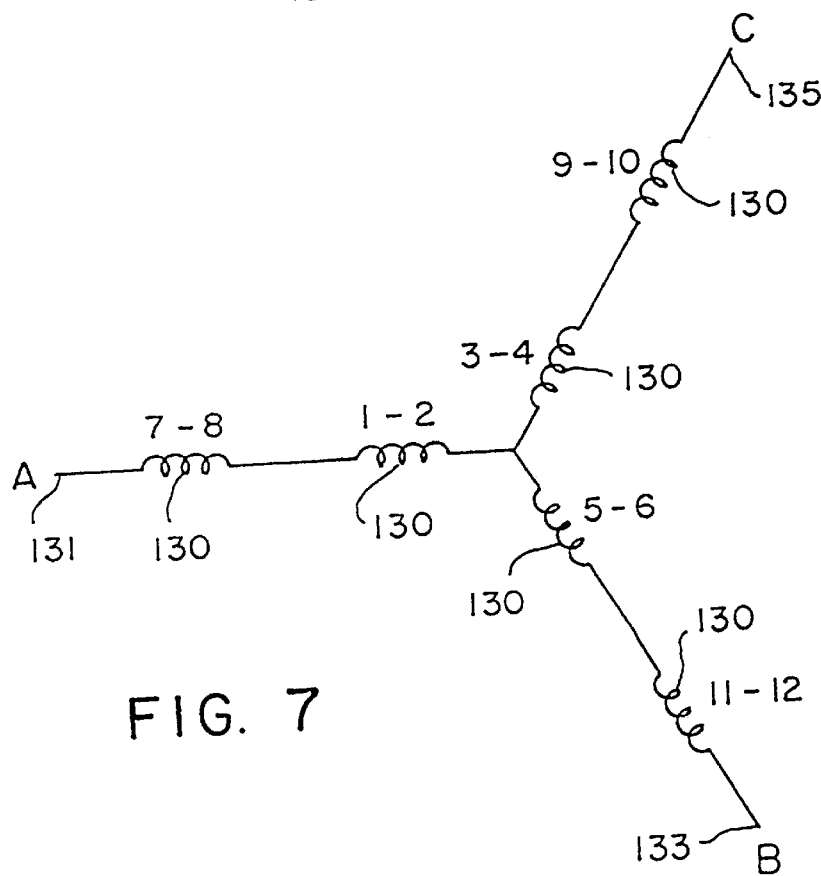
FIG. 7 is a schematic of the Y-connected coils of FIG. 6.

The stator 122, shown in FIG. 2 and FIG. 6, is composed of laminations 124 having twelve slots 126 similar to the laminations 48 shown in FIG. 1. Between each slot are T-shaped core posts 128. The laminations have a thickness of about 0.062 inches and are constructed of steel from Tempel Steel Co. of 1008 to 1018 C. R. S. The laminations 124 should be precisely aligned and may be held together and insulated by using 3M Scotchcast. To simplify winding, six coils 130 of one-hundred turns of twenty-five gauge magnetic wire are wrapped within the twelve slots as shown in FIG. 6. The coils are Y-connected electrically, as shown in FIG. 7, with three phase current from a motor controller 60 connected with the A B C phases. The end wires 131, 133, 135 are led through a central hole 137 in the shaft 82. The six coils 130 produce twelve poles and thus the 3/4 ratio between stator and rotor 129 is maintained. A gap of about twenty thousandths is maintained between the stator laminations and the magnetic shell 114.

To allow closed loop control of the motor 132 formed by the magnetic shell 114 and the stator 122, a plurality of Hall effect sensors are mounted on a mounting assembly 134 formed of grade LE Ryertex plastic. The mounting assembly 134 positions three Hall effect sensors 136 spaced 37.5 degrees apart. The spacing of the Hall effect sensors 136 allows all three phases to be monitored so that the Hall effect sensors can be used to switch power to the winding sequentially to drive the motor 132. The sensors 136 extend from the mounting assembly 134 to overlie the laminations 124 beneath the magnetic shell 114 of the rotor 129. In this way no additional magnet is required to drive the Hall effect sensors 136. Five leads 138 from the Hall effect sensors 136 are also routed through the hole 137 in the shaft 82 and connected to circuitry (not shown) which forms part of the controller 60 shown in FIG. 1.

The motors 38, 78 are preferably controlled by motor controllers 60 which communicate with a programmable controller 74. The programmable controller may be an industrial PC which communicates with controllers 60 connected to individual motors 38, 78 over a RS232 bus to set speed, set current limit, set hold mode, and/or current limit. The motor controllers can be three phase twenty-eight volt three amp supply, which utilizes the output from the Hall effect sensors for commutation and speed control. The design of the controllers 60 may utilize a MC33035 Brushless DC Motor Controller chip available from Motorola see http://mot2.mot-sps.com/books/dl128/pdf/mc33035rev3.pdf.

Individual eight bit words can be sent over the RS232 bus so that current limit and roller speed limit may be set on a scale of 0 to 255. Individual bus commands can be used to read roller speed and roller current. Control to effect breaking and holding of packages is also possible.

The construction of the motor 38 is designed to minimize cost and maximize reliability. Reliability is enhanced by the reduction in the number of wearing moving parts. The only parts subject to wear are the bearings, which rotate with respect to the rigid shaft. There is no wear between the rotor and the stator, because the magnetic shell is supported in closely spaced relation to the stator. Bearings typically have a wear life in the range of one-hundred thousand hours, which is much longer than the wear life of conventional gears and brushes. The design of the motor 38 allows for the use of low-cost components.

The stator design allows the armature to be wound on the outside of the stator which minimizes fabrication costs. The conveyor motors, particularly motor 132, produces a relatively high torque per amp per linear inch of motor, making it feasible to produce the gearless motorized roller with resulting high reliability, low noise and long life. Efficiency is normally not a large concern in the design of roller conveyors from a cost standpoint because of the relatively small amount of power consumed.

Efficiency is important, however, in maintaining the rolls at a low temperature. It is generally desirable to keep the surface of the roller tube 22 below about 110 degrees Fahrenheit to prevent material used in packaging from melting and adhering to the drive rollers.

Figure 8:
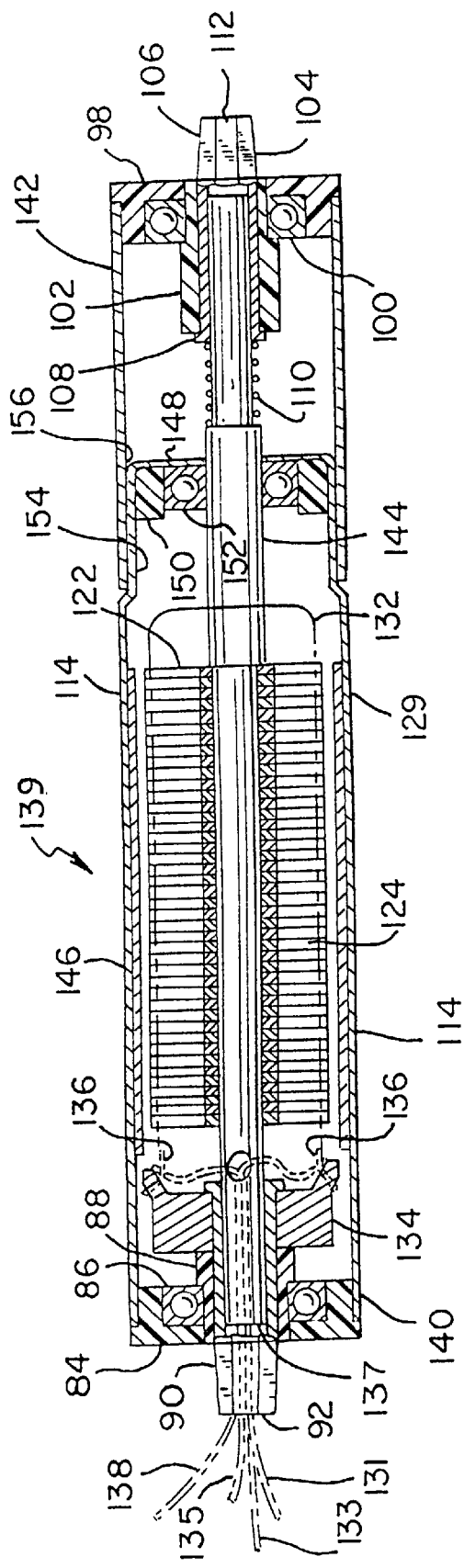
FIG. 8 is a cross-sectional view of another embodiment of the drive roll of this invention.

Another embodiment drive roll 139 is shown in FIG. 8. Drive rolls 20, 78, 139 are made in a number of lengths from approximately ten inches to as much as sixty inches long depending on the conveyor application. Some lengths are more widely used than others for example ten, twenty-four and thirty-two inches. Not infrequently, rolls of a particular length will be built for a single customer or large installation. This requires stocking, or manufacturing to order, a large number of different roller tube 80 sizes and shafts 82. The drive roll 139 allows a basic unit 140 including the drive motor 132 to be customized as to length by the addition of a roller tube extension 142, and using a length specific shaft 144.

This modularity is accomplished by forming the rotor tube 146 with a closed end 148 which accommodates a plastic spacer 150 and a third intermediate bearing 152. The closed end 148 has an opening through which the shaft 144 extends. A portion 154 of the roller tube 146 adjacent the closed end 148 has a slightly reduced diameter which forms an interference fit with the inside 156 of a portion of the roller tube extension 142. The overlap between the tube extension 142 and the roller tube 146 may be glued, welded, or brazed or a simple interference fit may be sufficient.

It should be understood that in addition to increasing the power of the motor in a single drive roller it is also possible to group rollers together to increase the amount of driving force available.

It should also be understood that the motor 38, 78 can be constructed to operate on power having two or more phases of drive current. In addition, the number of coils, number of wires, and number of turns per coil, together with wire gauge, are design variables, which will vary with the number of drive current phases, and the voltage of the drive current, used with the motor, and the amount of torque for which the motor is designed.

It should be understood that various types of sensors other then Hall effect can be used to determine the rotation rate and angular position of the rotor. Examples include Giant Magnetoresistive (GMR) type sensors available from Non-volatile Electronics, Inc., Eden Prairie, Minn., http://www.nve.com, flux gate sensors, optical and magnetic shaft encoders and similar devices.

It should be understood that the frequency of the drive current is varied and so the drive could be described as a variable frequency drive and was so described in my earlier U.S. Pat. No. 5,918,728. However that term is normally used to ascribe an AC motor drive and the more proper term is a commutated brushless DC motor controller, or just DC motor controller, as has been used herein for greater clarity.

It should be understood that the design described in FIG. 1 shows an open loop motor controller which varies the current frequency to control motor speed. The embodiments of FIGS. 2–8 show the utilization of feedback to provide drive current at a frequency and waveform which is optimized to accelerate/decelerate or maintain at speed the motor.

It is understood that the invention is not limited to the particular construction and arrangement of parts herein illustrated and described, but embraces such modified forms thereof as come within the scope of the following claims.

I claim:

1. A roller conveyor system comprising:

a frame;

a multiplicity of idler rollers positioned for rotation on the frame;

a plurality of drive rollers positioned on the frame, each drive roller having a shaft fixed against rotation to the conveyor frame; a stator having a core and at least three windings on the core, the stator being mounted about the shaft, the stator mounted about the rigid shaft; a roller tube surrounding the shaft and the stator, and having a first and a second end and an interior, two tube closures, one tube closure rigidly mounted to each of the first end and the second end of the roller tube, wherein the tube closures are rotatably mounted on the shaft, to rotatably mount the roller tube on the shaft; and a permanent magnet rotor having a plurality of poles, the rotor fixedly mounted to the roller tube interior and overlying and coaxial with the stator, the permanent magnet rotor and the stator forming a brushless three-phase D.C. motor, with the rotor and connected roller tube being driven by changes in induced magnetic fields in the stator;

at least one magnetic field sensor mounted on each stator and positioned to detect passage of the permanent magnets about the fixed shaft;

a plurality of three-phase power supply motor controllers for controlling the rotation speed of each drive roller, each motor controller arranged to utilize the output from the at least one magnetic field sensor mounted on each stator for commutation and speed control, each motor controller connected to one of said multiplicity of drive rollers for controlling the rotation speed of the connected drive roller rotor; and a programmable controller operably connected to the motor controllers to control the speed of all the drive rotors.

2. The roller conveyor system of claim 1 wherein the permanent magnetic rotor is constructed of a plurality of cylindrical segments, each segment constructed of ferromagnetic particles embedded in a flexible matrix, and wherein the plurality of poles is imposed on said cylindrical segment.

3. The roller conveyor system of claim 2 wherein the cylindrical segments have alignment means for aligning the plurality of poles imposed on each segment.

4. The roller conveyor system of claim 2 wherein the ferromagnetic particles are composed of an alloy of NdFeB.

5. The roller conveyor system of claim 1 wherein the ratio between the permanent magnetic poles and the number of poles produced by energizing the windings of the stator is a ratio of 4:3.

6. The roller conveyor system of claim 1 wherein six windings are employed on the stator and are arranged to induce twelve poles when energized.

7. The roller conveyor system of claim 1 wherein the roller tube has an exterior surface having a diameter of about 1.9 inches.

8. The roller conveyor system of claim 1 wherein the shaft has an extension which is slidably mounted on the shaft and biased in an extended position by a spring.

9. A drive roller adapted for use in a roller conveyor, the drive roller comprising:

a shaft adapted for rigid mounting to a conveyor support;

a stator having a core and plurality of windings on the core, the stator being mounted about the shaft;

a roller tube surrounding the shaft and the motor stator, the roller tube having an interior and having a first end and a second end and an exterior surface having a diameter of about 1.9 inches;

two tube closures, one rigidly mounted to each of the first end and the second end of the roller tube, wherein the tube closures are rotatably mounted on the shaft so that the roller tube rotates on the shaft; and a permanent magnet rotor having a plurality of poles, which alternate North South, the rotor fixedly mounted to the roller tube interior and over and coaxial with the stator, the permanent magnet rotor and the stator forming a brushless D.C. motor, such that the rotor and fixedly mounted roller tube are driven by changes in induced magnetic fields in the stator, wherein six windings are employed on the stator and are arranged to induce twelve poles when energized.

10. A drive roller adapted for use in a roller conveyor, the drive roller comprising:

a shaft adapted for rigid mounting to a conveyor support;

a stator having a core and plurality of windings on the core, the stator being mounted about the shaft;

a roller tube surrounding the shaft and the motor stator, the roller tube having an interior and having a first end and a second end and an exterior surface having a diameter of about 1.9 inches;

two tube closures, one rigidly mounted to each of the first end and the second end of the roller tube, wherein the tube closures are rotatably mounted on the shaft so that the roller tube rotates on the shaft; and a permanent magnet rotor having a plurality of poles, which alternate North South, the rotor fixedly mounted to the roller tube interior and over and coaxial with the stator, the permanent magnet rotor and the stator forming a brushless D.C. motor, such that the rotor and fixedly mounted roller tube are driven by changes in induced magnetic fields in the stator, wherein the permanent magnet rotor is constructed of a plurality of cylindrical segments, each segment constructed of ferromagnetic particles embedded in a flexible matrix, and wherein the plurality of poles is imposed on said cylindrical segment.

11. The drive roller of claim 10 wherein the cylindrical segments have alignment means for aligning the plurality of poles imposed on each segment.

12. The drive roller of claim 10 wherein the ferromagnetic particles are composed of an alloy of NdFeB.

13. A drive roller and roller controller for a roller conveyor comprising:

a shaft mounted fixedly against rotation to a conveyor support;

a stator having a core and at least three windings on the core, the windings producing a plurality of magnetic poles when energized, the stator being mounted about the shaft;

a roller tube surrounding the shaft and the stator, the roller tube having an interior, a first end and a second end, and an exterior surface;

a first tube closure mounted to the roller tube first end, and a second tube closure mounted to the roller tube second end, the tube closures being rotatably mounted on the shaft to rotatably mount the roller tube on the shaft;

a permanent magnet rotor having a plurality of poles which alternate North and South, the rotor being fixedly mounted to the roller tube interior and overlying and coaxial with the stator, the rotor and the stator forming a brushless three-phase motor, with the rotor and the fixedly mounted roller tube being driven by changes in induced magnetic fields in the stator; and a source of power having three phases of drive current connected to the windings of the stator for controlling the rotation speed of the rotor, wherein the roller tube is comprised of two portions:

a first tube portion having a closed end which accommodates an intermediate bearing to rotatably mount the closed end to the shaft, the closed end having portions forming an opening through which the shaft extends; and a second roller tube portion forming an extension of the first tube portion the second portion overlapping a portion of the first tube portion to form an interference fit with the first tube portion.

14. The drive roller of claim 13 wherein the exterior surface has a diameter of about 1.9 inches.

15. A drive roller and roller controller for a roller conveyor comprising:

a shaft mounted fixedly against rotation to a conveyor support;

a stator having a core and at least three windings on the core, the windings producing a plurality of magnetic poles when energized, the stator being mounted about the shaft;

a roller tube surrounding the shaft and the stator, the roller tube having an interior, a first end and a second end, and an exterior surface having a diameter of about 1.9 inches;

a first tube closure mounted to the roller tube first end, and a second tube closure mounted to the roller tube second end, the tube closures being rotatably mounted on the shaft to rotatably mount the roller tube on the shaft;

a permanent magnet rotor having a plurality of poles which alternate North and South, the rotor being fixedly mounted to the roller tube interior and overlying and coaxial with the stator, the rotor and the stator forming a brushless three-phase motor, with the rotor and the fixedly mounted roller tube being driven by changes in induced magnetic fields in the stator; and a source of power having three phases of drive current connected to the windings of the stator for controlling the rotation speed of the rotor, wherein the permanent magnet rotor is constructed of a plurality of cylindrical segments, each segment constructed of ferromagnetic particles embedded in a flexible matrix, and wherein the plurality of poles is imposed on said cylindrical segment.

16. The apparatus of claim 15 wherein the cylindrical segments have alignment means for aligning the plurality of poles imposed on each segment.

17. The apparatus of claim 15 wherein the ferromagnetic particles are composed of an alloy of NdFeB.

18. A drive roller adapted for use in a roller conveyor, the drive roller comprising:

a shaft adapted for rigid mounting to a conveyor support;

a stator having a core and plurality of windings on the core, the stator being mounted about the shaft;

a roller tube surrounding the shaft and the motor stator, the roller tube having an interior and having a first end and a second end and an exterior surface;

two tube closures, one rigidly mounted to each of the first end and the second end of the roller tube, wherein the tube closures are rotatably mounted on the shaft so that the roller tube rotates on the shaft; and a permanent magnet rotor having a plurality of poles, which alternate North South, the rotor fixedly mounted to the roller tube interior and over and coaxial with the stator, the permanent magnet rotor and the stator forming a brushless D.C. motor, such that the rotor and fixedly mounted roller tube are driven by changes in induced magnetic fields in the stator, wherein the roller tube is comprised of two portions:

a first tube portion having a closed end which accommodates an intermediate bearing to rotatably mount the closed end to the shaft, the closed end having portions forming an opening through which the shaft extends; and a second roller tube portion forming an extension of the first tube portion, the second portion overlapping a portion of the first tube portion to form an interference fit with the first tube portion.

19. The drive roller of claim 18 wherein the exterior surface has a diameter of about 1.9 inches.

20. A drive roller and roller controller for a roller conveyor comprising:

a shaft mounted fixedly against rotation to a conveyor support;

a stator having a core and at least three windings on the core, the windings producing a plurality of magnetic poles when energized, the stator being mounted about the shaft;

a roller tube surrounding the shaft and the stator, the roller tube having an interior, a first end and a second end, and an exterior surface having a diameter of about 1.9 inches;

a first tube closure mounted to the roller tube first end, and a second tube closure mounted to the roller tube second end, the tube closures being rotatably mounted on the shaft to rotatably mount the roller tube on the shaft;

a permanent magnet rotor having a plurality of poles which alternate North and South, the rotor being fixedly mounted to the roller tube interior and overlying and coaxial with the stator, the rotor and the stator forming a brushless three-phase motor, with the rotor and the fixedly mounted roller tube being driven by changes in induced magnetic fields in the stator; and a source of power having three phases of drive current connected to the windings of the stator for controlling the rotation speed of the rotor, wherein six windings are employed on the stator and are arranged to induce twelve poles when energized.

* * * * *